US008820700B2

(12) United States Patent
Roach et al.

(10) Patent No.: US 8,820,700 B2
(45) Date of Patent: Sep. 2, 2014

(54) ADJUSTABLE POD SUPPORT FOR MACHINE CONTROL DEVICE

(75) Inventors: Keegan Wade Roach, Peoria, IL (US); Nathan Daniel French, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 52 days.

(21) Appl. No.: 13/555,565

(22) Filed: Jul. 23, 2012

(65) Prior Publication Data

US 2014/0020497 A1 Jan. 23, 2014

(51) Int. Cl.
*F16M 13/00* (2006.01)

(52) U.S. Cl.
USPC .................... 248/618; 248/286.1; 248/287.1; 248/560; 248/623

(58) Field of Classification Search
USPC ........ 74/471 XY, 527; 137/636.1; 248/287.1, 248/424, 429, 286.1, 560, 618, 623
See application file for complete search history.

(56) References Cited

U.S. PATENT DOCUMENTS

| | | | |
|---|---|---|---|
| 4,126,376 A * | 11/1978 | Gommel et al. | 359/373 |
| 4,777,981 A * | 10/1988 | Petro | 137/636.2 |
| 5,379,663 A | 1/1995 | Hara | |
| 5,598,090 A * | 1/1997 | Baker et al. | 322/3 |
| 5,675,359 A * | 10/1997 | Anderson | 345/161 |
| 5,857,492 A * | 1/1999 | Salamun | 137/636.1 |
| 5,910,192 A * | 6/1999 | Pulford et al. | 74/479.01 |
| 6,201,196 B1 * | 3/2001 | Wergen | 200/6 A |
| 6,202,501 B1 | 3/2001 | Ikari | |
| 6,276,749 B1 | 8/2001 | Okazawa et al. | |
| 2007/0085362 A1 | 4/2007 | Sato | |
| 2008/0257090 A1 * | 10/2008 | Bertolasi et al. | 74/471 XY |
| 2010/0057307 A1 | 3/2010 | Copeland et al. | |

FOREIGN PATENT DOCUMENTS

| | | |
|---|---|---|
| GB | 2 383 399 A | 6/2003 |
| JP | 2006-028953 | 2/2006 |

* cited by examiner

*Primary Examiner* — Amy J Sterling
(74) *Attorney, Agent, or Firm* — Miller, Matthias & Hull

(57) ABSTRACT

Apparatus for adjusting the spatial position of a machine control device relative to a machine cab floor includes a support bracket defined by a pair of spaced parallel struts, and a pair of spaced cross beams orthogonally positioned relative to the struts, each cross beam having opposed ends rigidly securing the struts together. A laterally translatable carriage is supported on the cross beams for movement of the carriage between the struts along a first axis. The carriage includes a pair of spaced pin-receiving bores, orthogonally oriented with respect to the cross beams, that extend generally parallel to the struts. Spring-loaded pins may extend through each of the carriage bores to support movement of a control device along a second axis.

10 Claims, 7 Drawing Sheets

ADJUSTABLE POD SUPPORT FOR MACHINE CONTROL DEVICE

TECHNICAL FIELD

This disclosure relates generally to apparatus for making in-cab adjustments of implement control devices in a variety of machines, including wheel loaders. More particularly, the disclosure relates to apparatus adapted to facilitate the spatial positioning and adjustment of joy sticks mounted on control pods in at least two dimensions for machine operator effectiveness and comfort.

BACKGROUND

A variety of machines are employed in off-road tasks involving multiple and repetitive movements. As just one example, a wheel loader, moveable along the ground on wheels or tracks, may be used for excavating, and may include a backhoe mounted on the machine body for such purpose. The backhoe may be the only excavating implement on the machine body, or it may be one of a plurality of implements. For example, the wheel loader may include a backhoe mounted at one end, and a loader bucket mounted at the other end. Stabilizing struts may also be included to maintain the machine in place while an operator excavates dirt or sand with the backhoe, for example.

Since the excavating portion of a wheel loader machine is typically mounted at the rear of the machine, the operator may face the rear of the machine during an excavating operation. Controls for the moving and positioning the backhoe and/or the stabilizer struts may be located conveniently to the rear-facing direction, while controls for the front loader bucket, steering, engine throttle, and brake may be located more conveniently to the front-facing direction.

Modern machines including wheel loaders typically employ joystick-based control systems for achieving desired manipulation including precise positioning of various implements such as excavation buckets. Hydraulic systems may be included to operationally control physical movements of various boom and stabilizer parts. The machines may include dual control pods, each having a joystick disposed thereon, or alternatively may have joysticks disposed on armrests. The pods and/or armrests may be spaced apart on either side of the operator's workstation seat.

Throughout the life of the machine, operators of different sizes and shapes may operate the controls. These operators may require multiple seating positions during a typical work cycle, obviously depending upon performance effectiveness and comfort of the operator. Alternately, many operators may use a variety of machines, each having a variety of interior dimensions and placements of implement control pods. As a result, consistently comfortable and ergonomic operating positions for each operator for all operating situations may be challenging to achieve. Further, because an operator may need to use both right hand and left hand control devices, and because the controls may be sensitive, the ergonomics of an operator's work environment may directly affect productivity as well as giving rise to safety concerns.

Accordingly, there is a perceived need for control devices that are more fully adjustable than those currently available. For example, U.S. Pat. No. 6,276,749 discloses a mechanism for adjusting the control console of a work vehicle. However, the mechanism employs a four-bar linkage which, although providing motion within a single plane, does not accommodate linear motion. To the extent that its movements are along only curved paths, the mechanism offers limited utility.

An improved control pod structure may increase productivity of operators using a variety of machines and/or may alleviate need to adjust positions of an operator's seat multiple times during a work cycle.

SUMMARY OF THE DISCLOSURE

A position-adjustable mechanism for a machine control device, for example a joystick supported on a control pod, may offer ergonomic benefits to a machine operator. The machine may include a pod support bracket adapted to adjust the spatial position of the joystick relative to a fixed machine cab floor. The bracket may be defined by a pair of spaced vertically oriented struts, and a pair of spaced cross beams orthogonally positioned relative to the struts, each cross beam having opposed ends rigidly securing the struts together.

In accordance with one aspect of the disclosure, a laterally translatable carriage may be supported on the cross beams for movement of the carriage along a first axis that extends between the struts.

In accordance with another aspect of the disclosure, the carriage may include a pair of spaced pin-receiving bores, orthogonally oriented with respect to the cross beams, and extending generally along a second axis that may be vertically aligned with the struts.

In accordance with yet another aspect of the disclosure, spring-loaded pins may extend through each of the carriage bores to support movement of an associated control device along the second axis.

Finally, in accordance with a still further aspect of the disclosure, a joystick secured to the support bracket may, with respect to the machine floor, be laterally translatable via the carriage along the first axis, and vertically translatable via the pins along the second axis.

DETAILED DESCRIPTION

Figure 1:
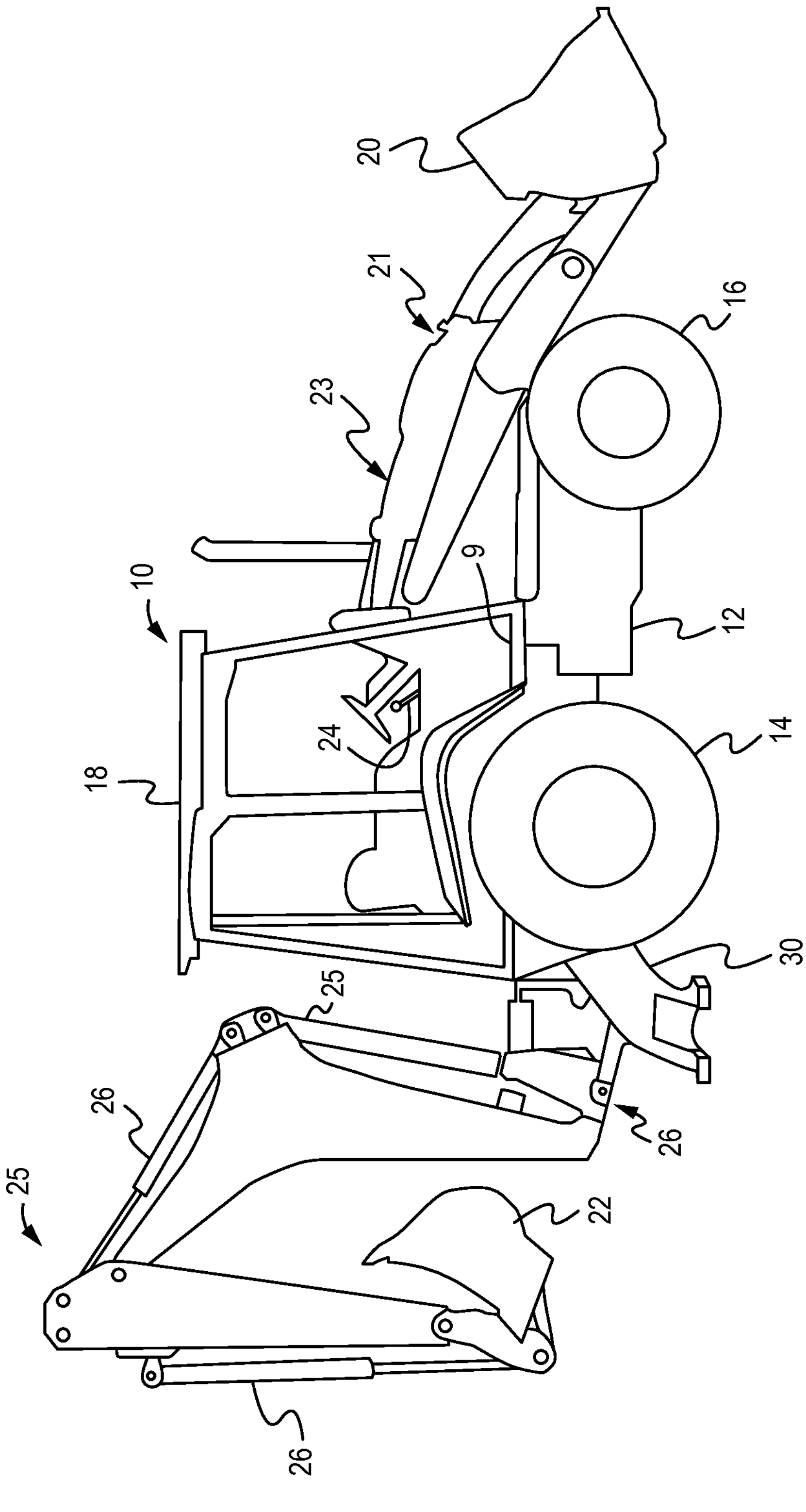
FIG. 1 is a side elevation view of a machine that may be equipped with the disclosed adjustable support for a control device.

FIG. 1 illustrates an exemplary machine, such as a wheel loader 10, which may incorporate a frame or chassis 12, and ground elements, such as a pair of rear and front wheels 14, 16, as depicted. Alternatively, instead of wheels 14, 16, the machine 10 may be provided with a pair of endless or crawler tracks (not shown) to permit transportation of the machine over the ground. The machine 10 may also include a cab 18 or other suitable facility in which to accommodate an operator (not shown). The cab 18 may include a fixed floor 9, to which may be secured suitable controls for operating a loader bucket 20 at a front end 21 of the machine 10, as well as a rear end backhoe bucket 22 at a rear end 19 thereof. The buckets 20 and 22 may respectively be manipulated by front and rear end controllable boom devices 23 and 25, respectively, which may be operated by hydraulic cylinders 26, as shown, and as otherwise may be appreciated by those skilled in the art.

Figure 2:
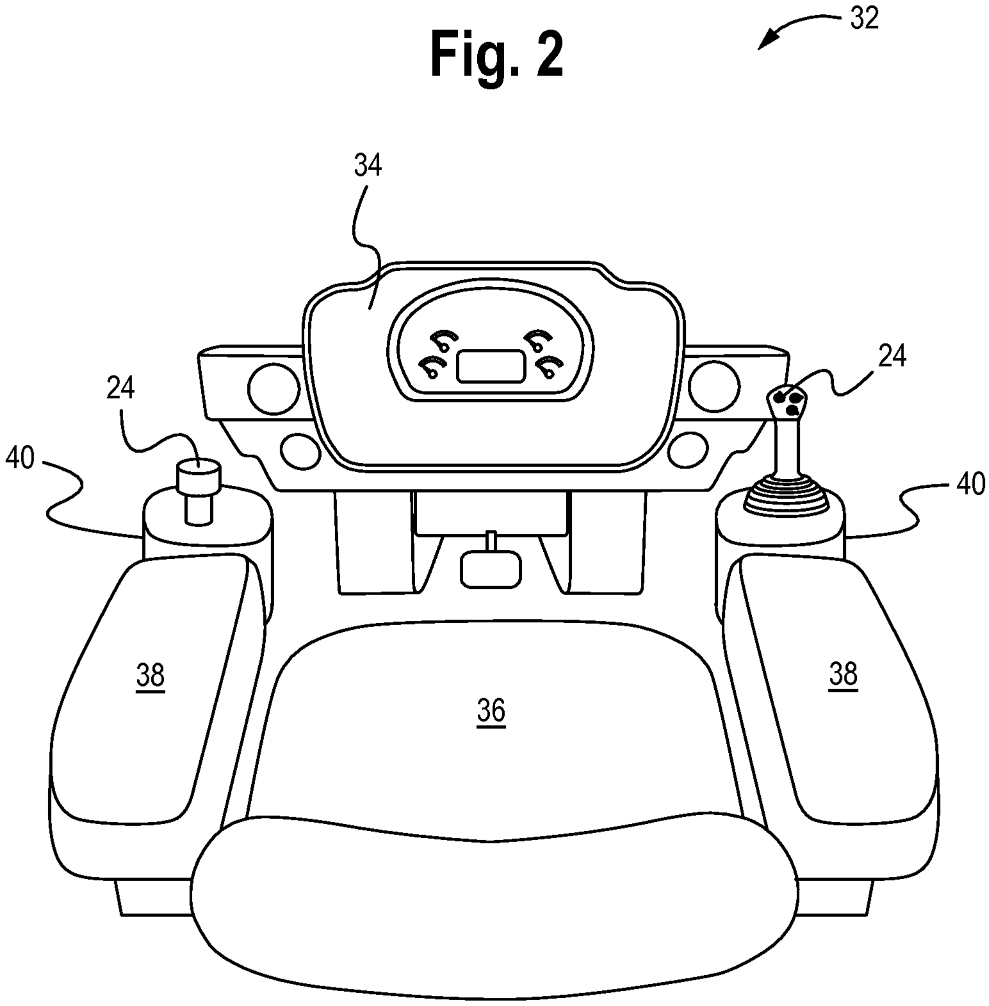
FIG. 2 is a perspective view of a machine cab workstation, showing an operator seat, control panel, and conventional dual control pods disposed at either side of the operator seat.

Referring now also to FIG. 2, the cab controls may include joysticks 24, adapted to manipulate the buckets 20 and 22, for excavating materials such as dirt or sand, for example. The joysticks 24 may also be effective to manipulate a pivotal swing assembly 28, which enables the rear boom device 25 to pivot about a vertical axis (not shown). A pair of outriggers or machine stabilizers 30 at the rear end 19 may be effective to keep the machine 10 from undesirable movements, such as ground shifting, when under the force loads imposed thereon during an excavation cycle.

Referring now specifically to FIG. 2, an operator work station 32 includes a control panel 34 that incorporates operating gauges and controls, as well as a seat 36 situated between left and right control pods 40. The control pods 40 may act as mounts for implement control devices, such as the right and left joysticks 24. While the seat 36 may be conventionally adjustable, adjustment capabilities within the control pods 40 may offer enhanced operational ergonomics by providing more control interface positions for an operator while he/she is manipulating machine implements via the joysticks 24. Although left and right armrests 38 are shown positioned immediately on either side of the seat 36, and just behind the control pods 40, this disclosure may be equally applicable to machines containing alternative control structures, such as machines with integral armrest and control pod arrangements, or even machines containing joysticks mounted directly to armrest structures.

Figure 3:
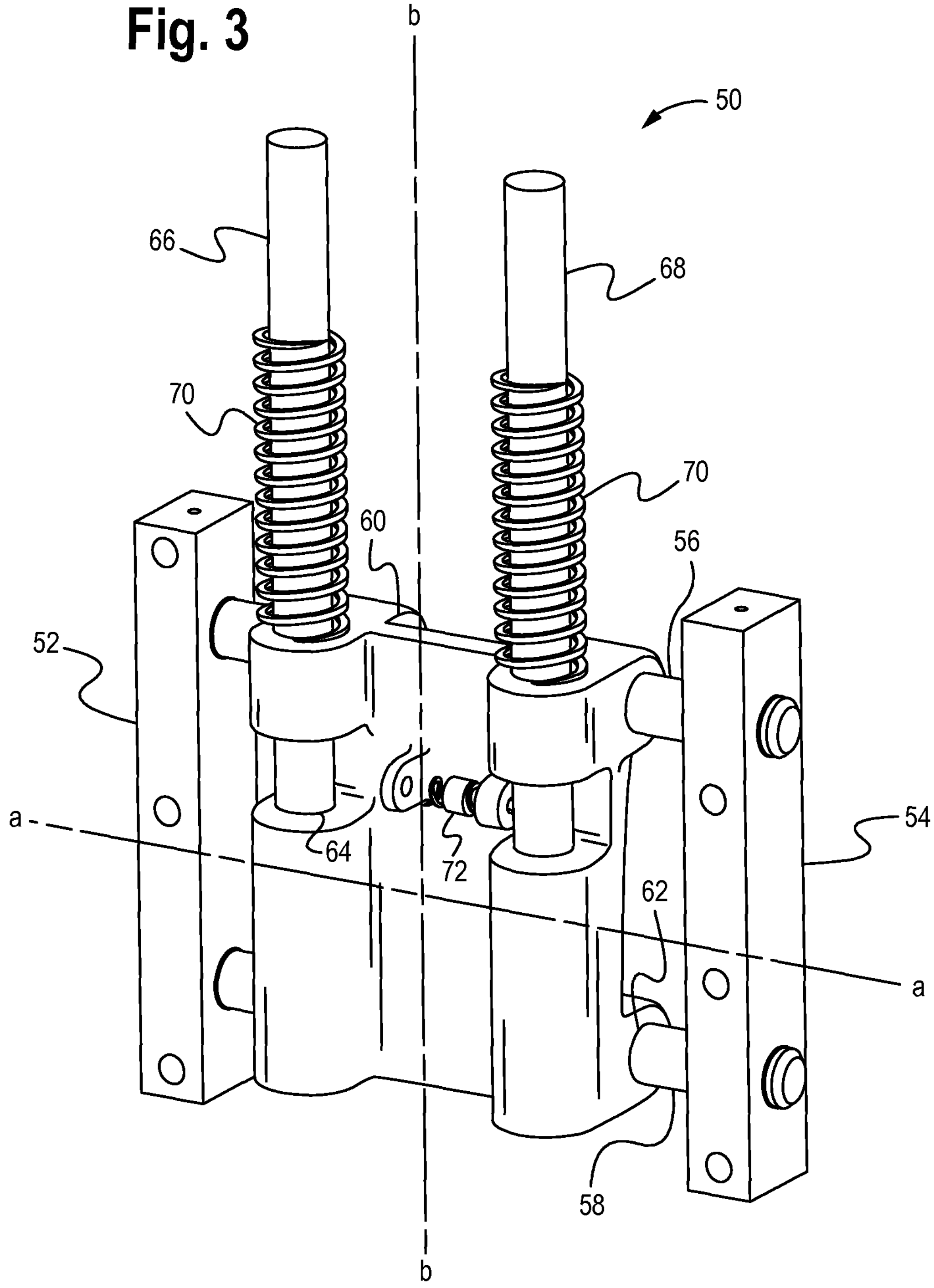
FIG. 3 is a perspective view of the disclosed adjustable control pod mechanism.

Referring now to FIG. 3, a multi-directionally adjustable control pod support mechanism is disclosed in the form of an adjustable bracket 50. The bracket 50, which may be incorporated within each control pod 40 shown in FIG. 2, may include a pair of (left and right) struts 52 and 54 as structural members, oriented along an axis a-a of FIG. 3. The struts are rigidly connected together by upper and lower cross beams 56 and 58, which extend orthogonally relative to the struts 52, 54. Supported on the cross beams for lateral translatable movement thereon is a carriage 60. The carriage includes laterally extending apertures or bores 62 to accommodate movement of the carriage 60 along the beams 56, 58, and thus along an axis a-a that extends between the struts 52, 54.

Figure 4:
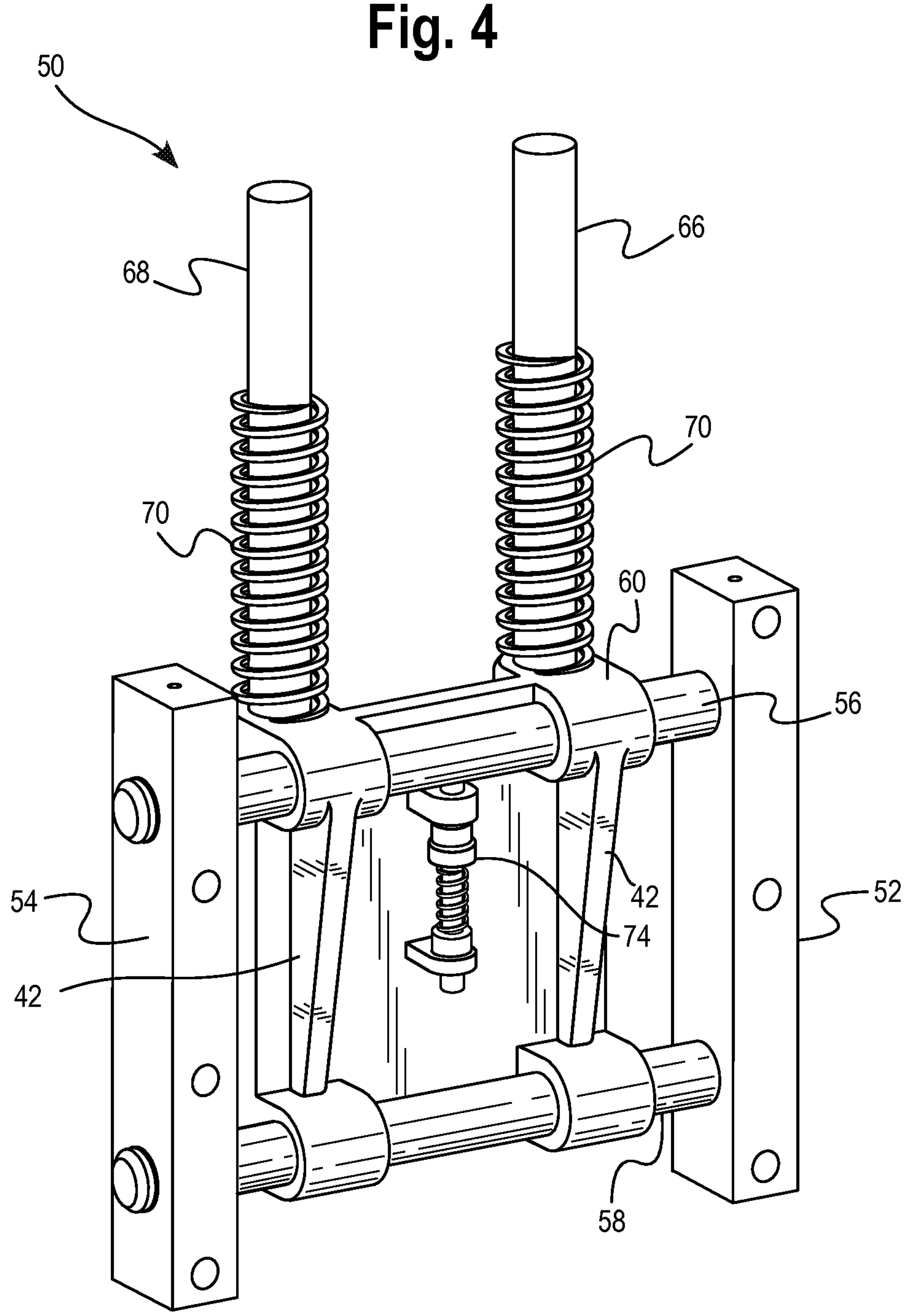
FIG. 4 is a rear view of the mechanism of FIG. 3.
Figure 5:
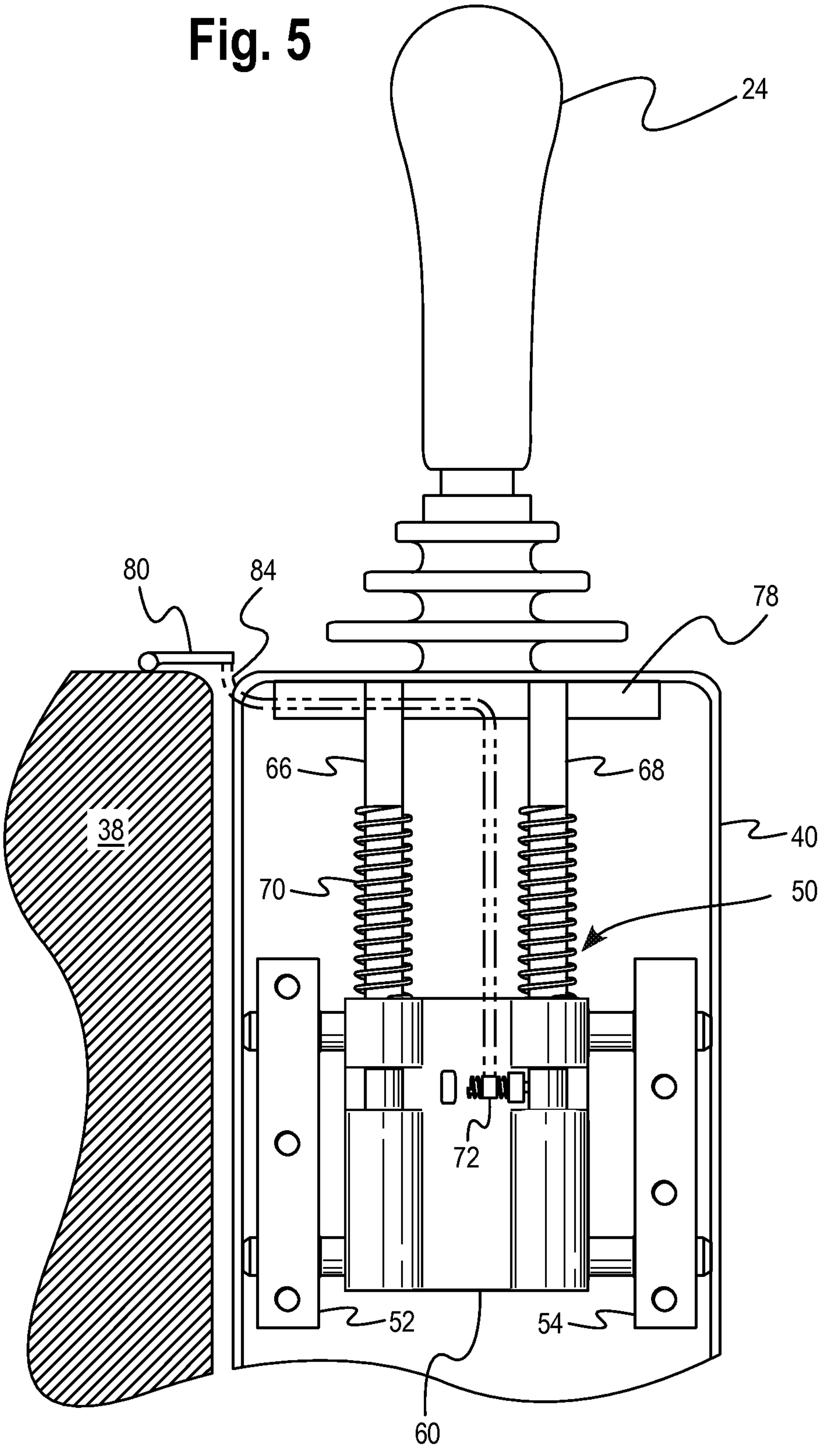
FIG. 5 is a frontal elevation view of a first embodiment of the adjustable control pod mechanism, shown contained within at least one of the control pods illustrated in FIG. 2.

A separate set of longitudinal bores 64, may extend parallel to the struts 52 and 54, and may be adapted to support vertical movement of left and right vertically extending spring-loaded pins 66 and 68 along an axis b-b, which extends orthogonally to axis a-a, as shown. FIG. 4 depicts the rear side of the carriage 60, including a pair of longitudinally extending structural support ribs 42 on the underside thereof. Referring now also to FIG. 5, upon installation of the bracket 50 within a control pod 40, the pins 66, 68 may engage a horizontally oriented, albeit horizontally and vertically translatable, joystick support plate 78 for effectively providing like movement of the joysticks 24, as supported on control pods 40 that may be fixed to the floor 9 of the cab 18. Springs 70 may be effective to bias the pins 66, 68 against a releasable friction lock 72 (FIGS. 3 and 5) for accommodating and selectively fixing discreet vertical movements thereof within the vertically oriented longitudinal carriage bores 64.

The locking mechanism 72 may be actuated by a manually operated release lever 80 secured directly via cable 84 to the locking mechanism 72. For such purpose, the release lever 80 may be secured either to the armrest 38 (as shown) or alternatively may be secured to the structure of the control pod 40. Similarly, referring back to FIG. 4, a separate releasable friction lock 74 may be effective to secure the carriage 60 at various desired lateral positions along the cross beams 56, 58, ideally among an infinite number of positions between the left and right struts 52 and 54. The latter may be employed particularly to facilitate a desirable single-handed adjustment capability.

To the extent that the path of any particular cable 72, 74 will be determined by the internal layout of the bracket 50, including the carriage 60, the cables as described herein are displayed only schematically and in phantom.

Figure 6:
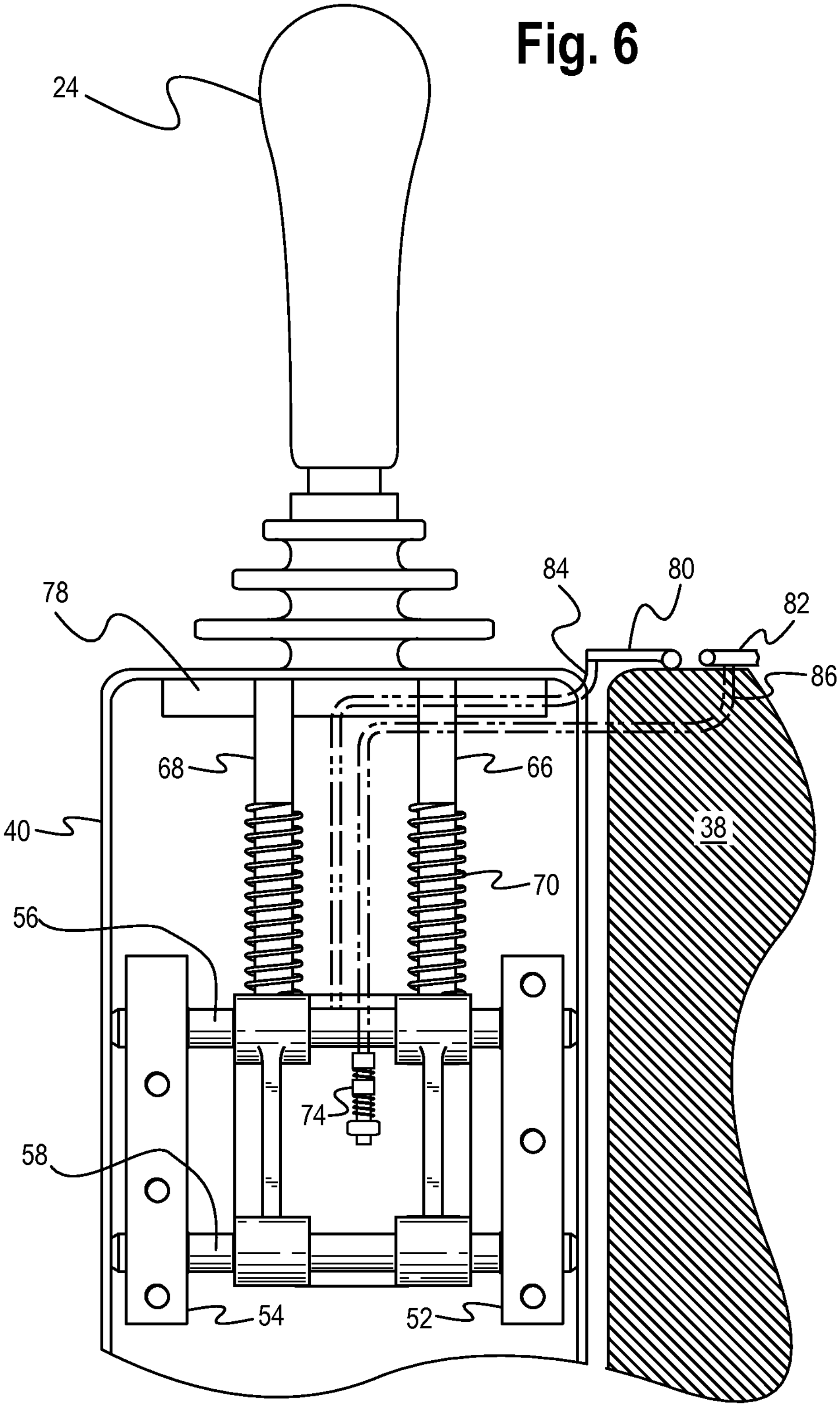
FIG. 6 is a view of the same embodiment of the adjustable control pod mechanism, showing use of dual release levers, with the control pod mechanism oriented to reveal the rear side of the mechanism per FIG. 3.

Referring now to FIG. 6, it will become apparent that the cable 84 may be operatively associated with the friction lock 72 (visible in FIGS. 3 and 5), while a separate cable 86 may be operatively associated with the friction lock 74 (visible in FIGS. 4 and 6). Thus, for controlling the above-described vertical movements of the pins 66, 68 with respect to the carriage 60, the release lever 80 may be secured to the cable 84. On the other hand, for controlling the above-described lateral movements of the carriage 60 along the cross beams 56, 58, a second release lever 82 may be operatively secured to the separate cable 86. As such, in the first-described embodiment of FIG. 6, each cable 84, 86 may be controlled by the separate release levers 80 and 82, as shown.

Figure 7:
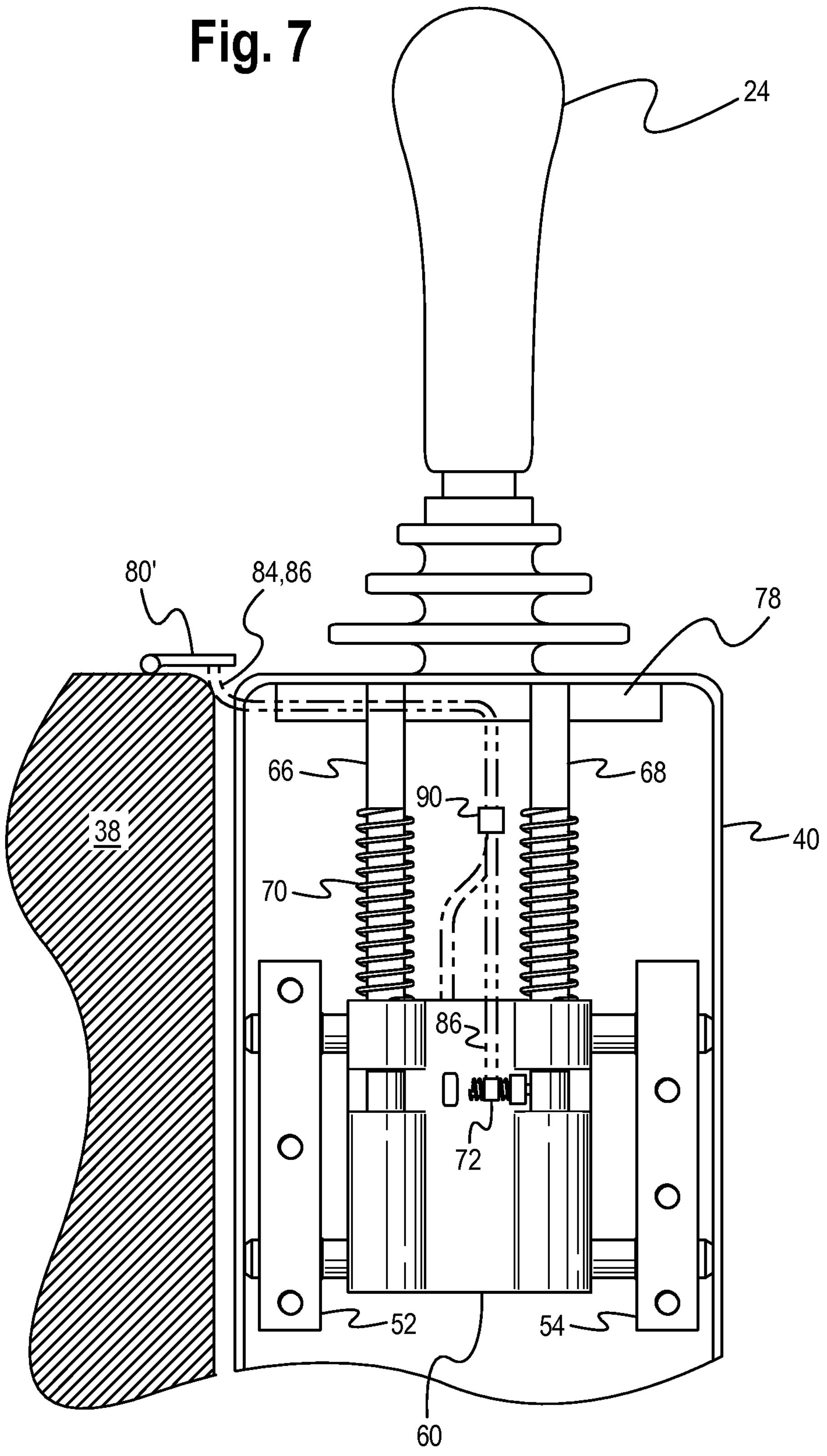
FIG. 7 is a view of a second embodiment of the adjustable mechanism that incorporates a latching system for enabling operation of multiple cables by a single lever.

Finally, referring to FIG. 7, another embodiment is shown that, although using multiple cables 84 and 86, employs a latching mechanism 90 to permit simultaneous operation of both cables by a single lever 80'. The latching mechanism 90 secures the cables 84 and 86 together to permit such operability.

Several other embodiments may be contemplated as falling within the scope of this disclosure. For example, compound pod structures may be utilized in which a front portion of the pod may be movable fore and aft for accommodating the physical movements of a machine operator, particularly with respect to getting into and out of the cab 18. In another embodiment, primary adjustment levers may be at least partially hidden under an armrest for ergonomic facilitation of "single-handed" adjustments. In addition, multiple latches may be useful for accommodating single-handed adjustments.

In still other embodiments, the carriage 60 may comprise a central casting, or otherwise be fabricated so as to contain the friction lock mechanisms 72. In addition, the cross beams 56, 58 and the pins 66, 68 may be lengthened or shortened, depending on any particular application, to afford optimal utility of the support bracket 50 in a variety of environments.

Finally and as noted above, in the described embodiment the pods 40 may be fixed to the cab floor 9. In such arrangement, the struts 52, 54 may be fixed to the upper interior pod structure (as shown in FIG. 5). Alternatively, the bracket 50 may be positioned at the bottom of the pod 40. As such, the struts 52, 54 may be fixed to the floor 9, while the bottom of the pod may be fixed to the pins 66, 68, such that the entire pod may be movable along the a-a and b-b axes. The latter is deemed to fall within the scope of this disclosure as another variation. Indeed, a plurality of such brackets 50 may be employed to provide an even greater flexibility. For example, the embodiment of FIG. 5 may be used in combination with the utilization of a second bracket 50 situated between the cab floor 9 and the bottom of the pod 40, as just described. As such, even greater vertical and lateral movements may be afforded with respect to the spatial positioning of implement control devices of machines, including joysticks.

INDUSTRIAL APPLICABILITY

This disclosure may be beneficial for a variety of off-road machines, including excavators, crawler tractors, and wheel loaders. While the disclosed control pod adjustment mechanism has been described principally in connection with a wheel loader, it may be appreciated that yet other types of machines not shown nor suggested may benefit from its utility, as well.

In operation, the machine 10 may include the adjustment support bracket 50 to facilitate ergonomic positional adjustments of the controls 24 for the benefit of a machine operator, by permitting accommodating movements of the controls along the vertical, or a-a, axis, as well as the lateral, or b-b, axis. After any particular adjustment is made, the selected adjustment may be at least temporarily secured by way of the described releasable friction locking mechanism 72. Independently of any machine operator seat adjustments, the machine operator may benefit from the feature of control device adjustability as described above.

It may be apparent to those skilled in the art that various modifications and variations, even beyond those described, may be suitable for inclusion within the scope of the disclosed control system and method without departing from the spirit of the disclosure. Other embodiments may become apparent to those skilled in the art via considerations of the specification and by way of practice of the disclosed embodiments. It is thus intended that the specification and examples be considered as exemplary only.

What is claimed is:

1. Apparatus for adjusting spatial position of a machine control pod relative to a fixed machine floor, the apparatus comprising:

a support bracket defined by a pair of spaced struts and a pair of spaced cross beams orthogonally positioned relative to the struts, each cross beam having two opposed ends rigidly securing the struts together;

a carriage mounted on the cross beams via bores in the carriage through which the cross beams are disposed, the cross beams supporting the carriage for translatable movement of the carriage between the struts along a first axis;

the carriage including a pair of spaced pin-receiving bores aligned with the struts and being oriented orthogonally with respect to the cross beams; and a pair of spring-loaded pins extending into each of the respective pin-receiving bores of the carriage, the pair of spring-loaded pins moveable in the pin-receiving bores along a second axis perpendicular to the first axis;

whereby the machine control pod is adapted to be secured to the pair of spring-loaded pins and be translatable relative to the machine floor via the carriage along the first axis, and via the spring-loaded pins along the second axis.

2. The apparatus of claim 1, further comprising a releasable friction lock, wherein the spatial position of the machine control pod may be adjusted single-handedly by a machine operator.

3. The apparatus of claim 1, wherein movement of the carriage along the first axis is horizontally, and traverses between the struts of the bracket.

4. The apparatus of claim 1, wherein movement of the pins along the second axis comprises vertical translation thereof within the carriage bores.

5. The apparatus of claim 1, wherein the struts are parallel with respect to one another.

6. The apparatus of claim 1, wherein the cross beams are parallel with respect to one another.

7. The apparatus of claim 2, wherein the releasable friction lock interacts relative to the carriage with at least one of the pins to secure the pin at selective locations along the first axis.

8. The apparatus of claim 2, wherein the releasable friction lock interacts with at least one crossbeam to secure the carriage at selective locations along the second axis.

9. The apparatus of claim 2, wherein upper portions of the pins engage a joystick support plate.

10. The apparatus of claim 2, wherein the releasable friction lock is actuated by a finger-controlled release lever and cable device.

* * * * *